(12) United States Patent
Shikina et al.

(10) Patent No.: US 11,758,296 B2
(45) Date of Patent: Sep. 12, 2023

(54) PHOTOELECTRIC CONVERSION DEVICE, IMAGING SYSTEM, MOVING BODY, AND EXPOSURE CONTROL DEVICE

(71) Applicant: CANON KABUSHIKI KAISHA, Tokyo (JP)

(72) Inventors: Noriyuki Shikina, Hachioji (JP); Shinya Igarashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 16/944,222

(22) Filed: Jul. 31, 2020

(65) Prior Publication Data

US 2021/0044766 A1 Feb. 11, 2021

(30) Foreign Application Priority Data

Aug. 9, 2019 (JP) ................................. 2019-147706

(51) Int. Cl.
*H04N 25/50* (2023.01)
*G06T 7/55* (2017.01)
(Continued)

(52) U.S. Cl.
CPC ............... *H04N 25/50* (2023.01); *G06T 7/55* (2017.01); *H04N 25/40* (2023.01); *H04N 25/53* (2023.01);
(Continued)

(58) Field of Classification Search
CPC .................................................... H04N 5/3535
See application file for complete search history.

(56) References Cited

U.S. PATENT DOCUMENTS 8,742,310 B2 6/2014 Guezzi
10,389,964 B2 8/2019 Taniguchi
(Continued)

FOREIGN PATENT DOCUMENTS

JP 4-502688 A 5/1992
JP 2012-151847 8/2012
(Continued)

OTHER PUBLICATIONS

EPO, Machine Translation of JP 2019-068405 A (Year: 2022).*
(Continued)

*Primary Examiner* — David N Werner
(74) *Attorney, Agent, or Firm* — VENABLE LLP

(57) ABSTRACT

Provided is a photoelectric conversion device including: a plurality of pixel circuits each including a photoelectric conversion unit configured to generate charges by photoelectric conversion and a transistor configured to transfer the charges from the photoelectric conversion unit; and a plurality of exposure control circuits each including a capacitor configured to hold a signal corresponding to an exposure period in the photoelectric conversion unit and a comparator circuit configured to compare a potential of a first terminal of two terminals of the capacitor with a threshold potential. Each of the plurality of exposure control circuits controls an exposure period of the photoelectric conversion unit by outputting a signal based on a comparison result caused by the comparator circuit to a control terminal of the transistor and driving the transistor.

29 Claims, 13 Drawing Sheets

(51) Int. Cl.
*H04N 25/79* (2023.01)
*H04N 25/771* (2023.01)
*H04N 25/778* (2023.01)
*H04N 25/57* (2023.01)
*H04N 25/53* (2023.01)
*H04N 25/77* (2023.01)
*H04N 25/59* (2023.01)
*H04N 25/78* (2023.01)
*H04N 25/40* (2023.01)
*H04N 25/533* (2023.01)

(52) U.S. Cl.
CPC ............. *H04N 25/57* (2023.01); *H04N 25/59* (2023.01); *H04N 25/77* (2023.01); *H04N 25/771* (2023.01); *H04N 25/778* (2023.01); *H04N 25/78* (2023.01); *H04N 25/79* (2023.01); *G06T 2207/30248* (2013.01); *H04N 25/533* (2023.01)

(56) References Cited

U.S. PATENT DOCUMENTS

| | | | |
|---|---|---|---|
| 10,659,713 B2 | 5/2020 | Shikina | |
| 2005/0205761 A1* | 9/2005 | Shah | H04N 25/77 348/E5.079 |
| 2009/0072120 A1* | 3/2009 | McGarry | H04N 5/2353 250/208.1 |
| 2010/0176275 A1* | 7/2010 | Vampola | H04N 25/77 250/214 A |
| 2013/0119233 A1 | 5/2013 | Guezzi | |
| 2016/0073016 A1 | 3/2016 | Ohya | |
| 2018/0332247 A1* | 11/2018 | Do | H04N 25/59 |
| 2020/0018653 A1* | 1/2020 | Matsumiya | G01J 1/44 |
| 2020/0154067 A1 | 5/2020 | Igarashi | |
| 2020/0396399 A1* | 12/2020 | Tsai | H04N 5/3765 |
| 2021/0235028 A1* | 7/2021 | FINATEU | H04N 5/37455 |
| 2021/0344854 A1* | 11/2021 | Bock | H04N 25/75 |

FOREIGN PATENT DOCUMENTS

| | | | | |
|---|---|---|---|---|
| JP | 2019-21987 | | 2/2019 | |
| JP | 2019068405 A | * | 4/2019 | ........ B60W 30/0956 |
| WO | 90/01844 A1 | | 2/1990 | |
| WO | WO-0247377 A1 | * | 6/2002 | ....... H01L 27/14609 |
| WO | WO-2010087881 A | * | 8/2010 | ....... H01L 27/14609 |

OTHER PUBLICATIONS

U.S. Appl. No. 17/114,533, filed Dec. 8, 2020 by Noriyuki Shikina et al.

U.S. Appl. No. 16/984,402, filed Aug. 4, 2020 by Yoshiko Shigiya et al.

Japanese Search Report dated Jun. 6, 2023 in corresponding Japanese Patent Application No. 2019-147706 (English translation included).

* cited by examiner

PHOTOELECTRIC CONVERSION DEVICE, IMAGING SYSTEM, MOVING BODY, AND EXPOSURE CONTROL DEVICE

BACKGROUND OF THE INVENTION

Field of the Invention

The present invention relates to a photoelectric conversion device, an imaging system, a moving body, and an exposure control device.

Description of the Related Art

Japanese Patent Application Laid-Open No. 2012-151847 discloses an image sensor that includes a plurality of pixels each having a photodiode, a plurality of readout circuits each connected to the photodiode, and a control electronic circuit that controls a period of charge accumulation in each photodiode. Accordingly, the image sensor of Japanese Patent Application Laid-Open No. 2012-151847 can set a suitable exposure period on a pixel basis or on a pixel group basis.

In the image sensor disclosed in Japanese Patent Application Laid-Open No. 2012-151847, a circuit used for controlling the exposure period is formed of a large number of elements. Thus, there may be a problem of an increase in the circuit scale.

SUMMARY OF THE INVENTION

Accordingly, the present invention intends to reduce the circuit scale in a photoelectric conversion device, an imaging system, a moving body, and an exposure control device in which different exposure periods can be set on a pixel basis or on a pixel region basis.

According to an aspect of the present invention, there is provided a photoelectric conversion device including: a plurality of pixel circuits each including a photoelectric conversion unit configured to generate charges by photoelectric conversion and a transistor configured to transfer the charges from the photoelectric conversion unit; and a plurality of exposure control circuits each including a capacitor configured to hold a signal corresponding to an exposure period in the photoelectric conversion unit and a comparator circuit configured to compare a potential of a first terminal of two terminals of the capacitor with a threshold potential. Each of the plurality of exposure control circuits controls an exposure period of the photoelectric conversion unit by outputting a signal based on a comparison result caused by the comparator circuit to a control terminal of the transistor and driving the transistor.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Note that the same elements or corresponding elements throughout a plurality of drawings are labeled with a common reference, and the description thereof may be omitted or simplified.

First Embodiment

Figure 1:
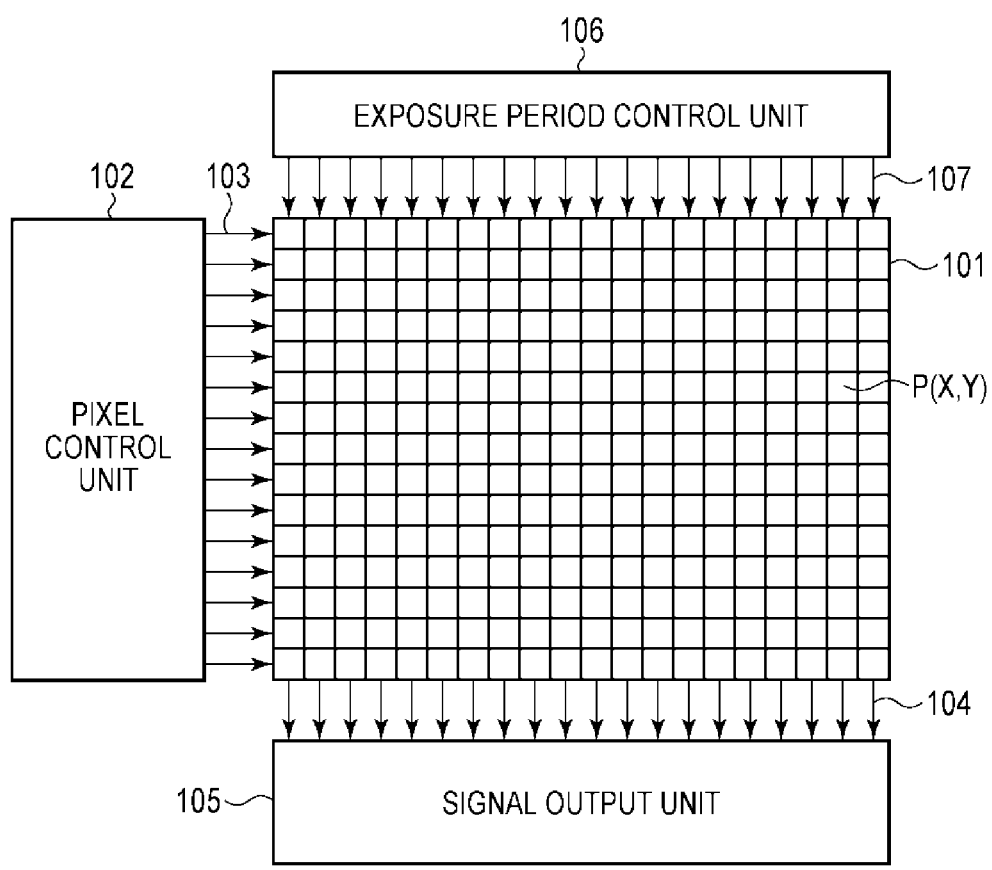
FIG. 1 is a block diagram illustrating a configuration example of a photoelectric conversion device according to a first embodiment.

FIG. 1 is a block diagram illustrating a configuration example of a photoelectric conversion device according to the present embodiment. The photoelectric conversion device may be, for example, an imaging device, a focus detection device, a ranging device using a Time of Flight (TOF) technology or the like, or the like but is not limited thereto. In the present embodiment, the photoelectric conversion device is an imaging device that captures an image such as a static image or a moving image.

The photoelectric conversion device has a pixel unit 101, a pixel control unit 102, a pixel control line group 103, a pixel output line group 104, a signal output unit 105, an exposure period control unit 106, and an exposure data line group 107. The pixel unit 101 includes a plurality of pixels P arranged in a matrix over a plurality of rows and a plurality of columns. In FIG. 1, each of rectangular blocks depicted in the pixel unit 101 corresponds to a single pixel P. When a pixel P at a particular position in the pixel unit 101 is referred to, the pixel P may be denoted with coordinates as P(X, Y). Herein, (X, Y) means the coordinates of the pixel P represented by (column number, row number). For example, the leftmost top pixel P in the pixel unit 101 is denoted as P(1, 1). Note that, although FIG. 1 illustrates 300 pixels P arranged over 15 rows by 20 columns, the number of pixels P arranged in the pixel unit 101 is not particularly limited.

The pixel control unit 102 is a control circuit unit that controls the operation of the pixels P arranged in the pixel unit 101 by using control signals supplied to the pixel unit 101 via the pixel control line group 103. The pixel control line group 103 includes a plurality of control lines corresponding to the plurality of rows of a pixel array forming the pixel unit 101. Each of the pixel control lines typically includes a plurality of control lines. Each of the plurality of pixel control lines is connected to each of the pixels P arranged on a corresponding row. Thereby, the pixel control unit 102 can control the operation of the pixels P arranged in the pixel unit 101 on a row basis.

The exposure period control unit 106 is a control circuit unit that supplies control signals used for controlling exposure periods of the pixels P arranged in the pixel unit 101 by means of control signals supplied to the pixel unit 101 via the exposure data line group 107. The exposure data line group 107 includes a plurality of exposure data lines corresponding to the plurality of columns of the pixel array forming the pixel unit 101. Each of the plurality of exposure data lines is connected to each of the pixels P arranged on a corresponding column. Thereby, the exposure period control unit 106 can control exposure periods of the pixels P arranged in the pixel unit 101 on a column basis.

The pixel output line group 104 includes a plurality of pixel output lines corresponding to a plurality of columns of the pixel array forming the pixel unit 101. Each of the plurality of pixel output lines is connected to each of the pixels P arranged on a corresponding column. Thereby, signals read out from the pixels P on each column arranged on a row selected by the pixel control unit 102 can be input to the signal output unit 105 via the pixel output line group 104.

The signal output unit 105 has a function of performing predetermined signal processing on signals output from the pixel unit 101 and then outputting the processed signal to the outside. The signal processing performed by the signal output unit 105 is not particularly limited and may include an amplification process or an analog-to-digital (AD) conversion process, for example.

The pixel control unit 102, the exposure period control unit 106, and the signal output unit 105 may be controlled by control signals supplied from a control unit (not illustrated) included in the photoelectric conversion device or from the outside of the photoelectric conversion device.

Figure 2:
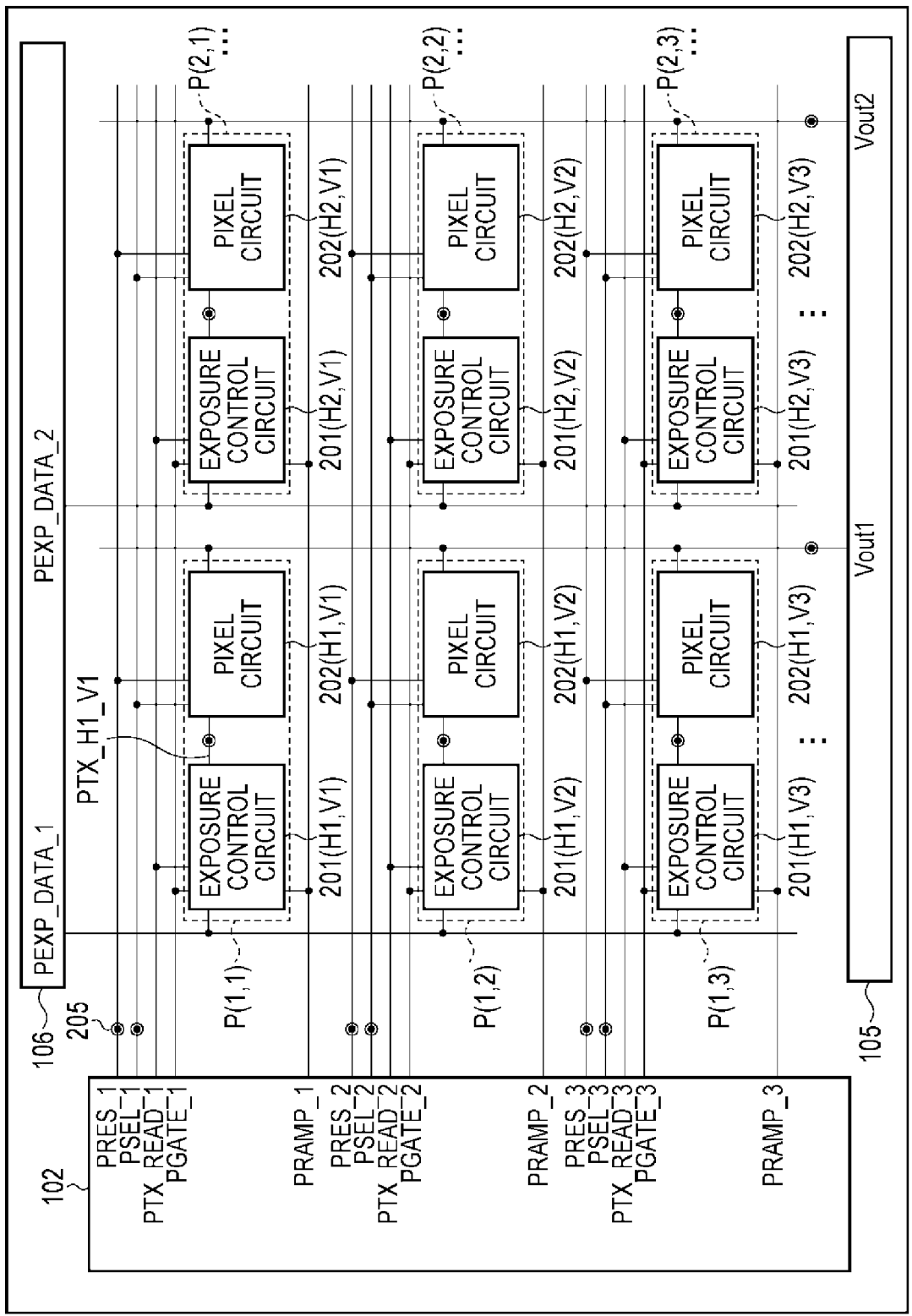
FIG. 2 is a block diagram illustrating a configuration example of the photoelectric conversion device according to the first embodiment.
Figure 3:
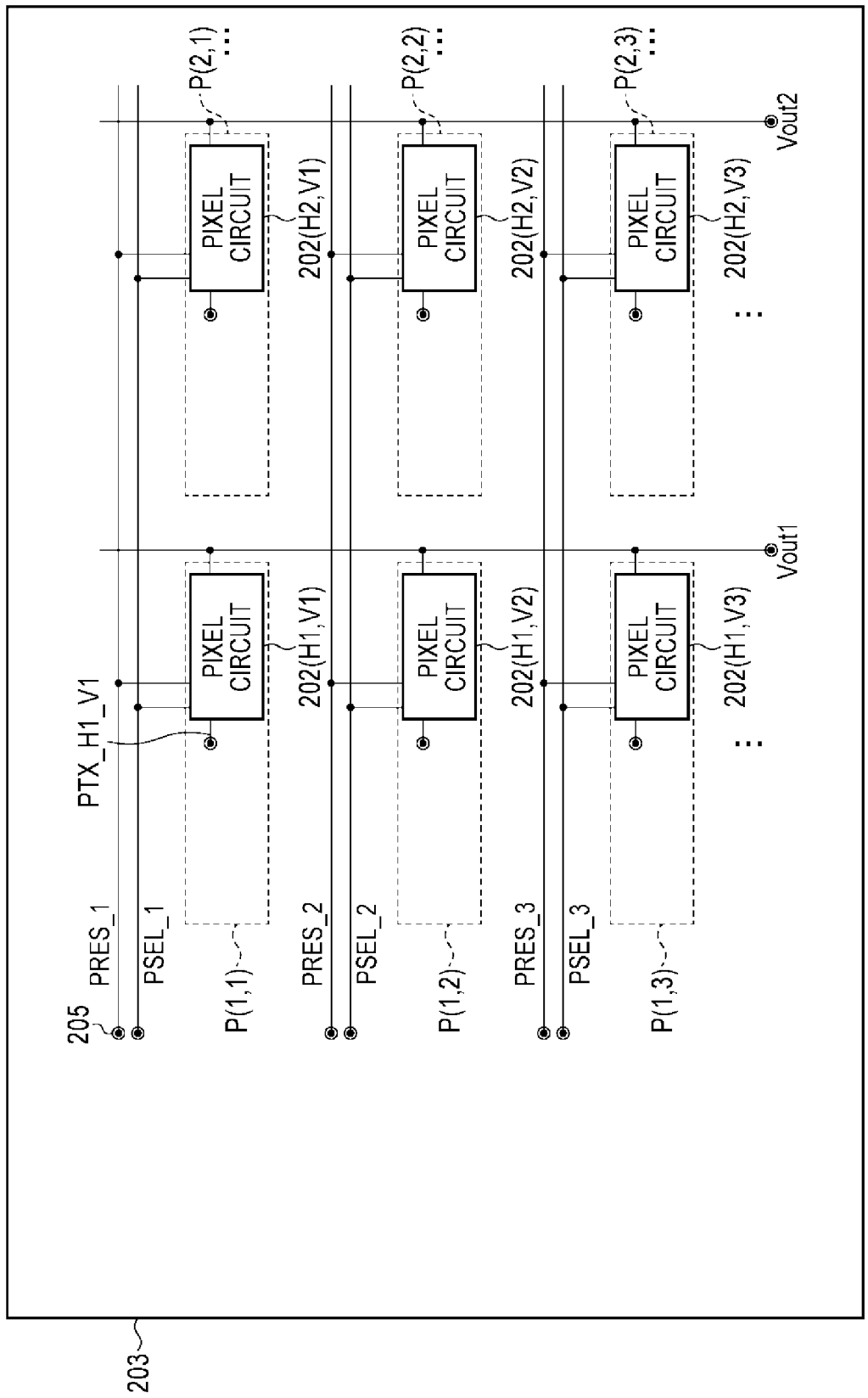
FIG. 3 is a block diagram illustrating a configuration example of a pixel substrate according to the first embodiment.
Figure 4:
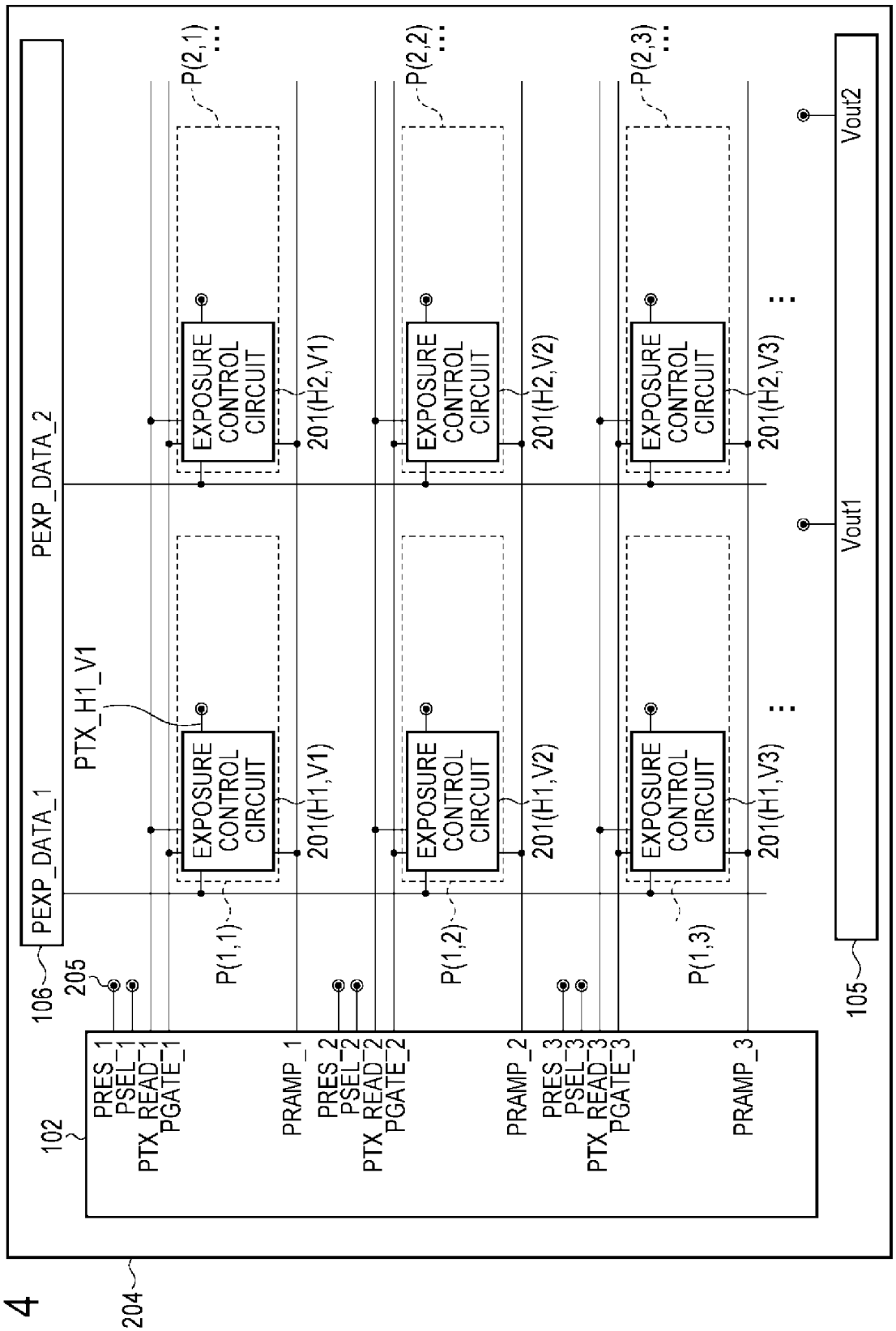
FIG. 4 is a block diagram illustrating a configuration example of a control substrate according to the first embodiment.

The photoelectric conversion device of the present embodiment is structured such that two substrates of a pixel substrate (first substrate) and a control substrate (second substrate) that functions as an exposure control device are stacked. FIG. 2 is a block diagram illustrating an overall configuration of the photoelectric conversion device in which the pixel substrate and the control substrate are attached to each other. Further, FIG. 3 is a block diagram illustrating a configuration example of the pixel substrate, and FIG. 4 is a block diagram illustrating a configuration example of the control substrate. The configuration example of the photoelectric conversion device will be described below in more detail with reference to FIG. 2 to FIG. 4.

As illustrated in FIG. 2, each of the plurality of pixels P includes an exposure control circuit 201 and a pixel circuit 202. When a row number and a column number on which the exposure control circuit 201 and the pixel circuit 202 are arranged are referred to, the exposure control circuit 201 and the pixel circuit 202 may be denoted with a row number and a column number as 201(H1, V1) and 202 (H1, V1). Herein, H1, H2, ... denote column numbers, and V1, V2, ... denote row numbers.

As illustrated in FIG. 3, a plurality of pixel circuits 202 arranged in a matrix over a plurality of rows and a plurality of columns are provided on a pixel substrate 203. As illustrated in FIG. 4, the pixel control unit 102, the signal output unit 105, the exposure period control unit 106, and a plurality of exposure control circuits 201 arranged in a matrix over a plurality of rows and a plurality of columns are provided on a control substrate 204. The pixel substrate 203 and the control substrate 204 are electrically connected to each other by a plurality of contact portions 205.

The pixel control unit 102 outputs control signals PRES, PSEL, PTX_READ, PGATE, and PRAMP to the pixels P on each row. The exposure period control unit 106 outputs a control signal PEXP_DATA to the pixel P on each column. In the description of these control signals, when a row number or a column number of a pixel P to which a control signal is supplied is refers to, a row number or a column number may be provided, for example, PRES_1, PSEL_1, PEXP_DATA_1, or the like.

The control signals PTX_READ, PGATE, PRAMP, and PEXP_DATA are input to the exposure control circuit 201. The exposure control circuit 201 outputs a control signal PTX to the pixel circuit 202 based on these control signals. Note that, in the description of the control signal PTX, to indicate a column number and a row number of the corresponding pixel P, a column number and a row number may be provided, for example, PTX_H1_V1 or the like.

The control signals PRES, PSEL, and PTX are input to the pixel circuit 202. The pixel circuit 202 performs photoelectric conversion in accordance with these control signals and outputs a pixel signal Vout to the signal output unit 105. Note that, in the description of the pixel signal Vout, a column number may be provided, for example, Vout1, Vout2, ....

Since a plurality of exposure control circuits 201 and a plurality of pixel circuits 202 are arranged, a large element area is required. In the present embodiment, however, the substrate on which the pixel circuits 202 are arranged and the substrate on which the exposure control circuits 201 are arranged are different from each other, and thus the element area may be reduced compared to a case where the pixel circuits 202 and the exposure control circuits 201 are arranged on a single substrate.

Figure 5:
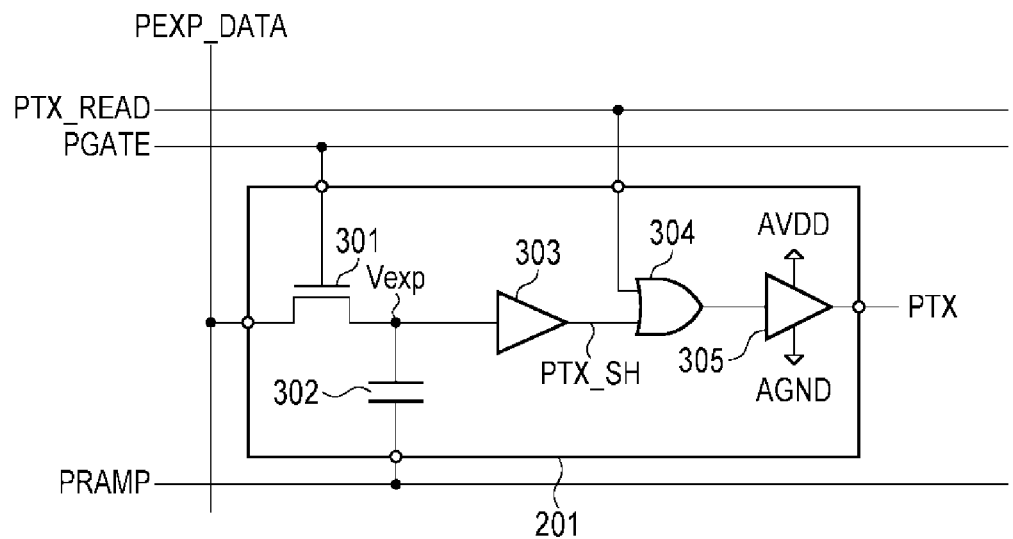
FIG. 5 is a circuit diagram illustrating a configuration example of an exposure control circuit according to the first embodiment.

FIG. 5 is a block diagram illustrating a configuration example of the exposure control circuit 201 according to the present embodiment. The exposure control circuit 201 includes a transistor 301, a capacitor 302, a comparator 303, an OR gate 304, and a level shifter 305. The transistor 301 is an NMOS transistor, for example. The comparator 303 is a circuit that outputs a high level as an output voltage PTX_SH when an input voltage Vexp exceeds a comparison level Vbase that is a predetermined threshold potential or, otherwise, outputs a low level as the output voltage PTX_SH. The OR gate 304 is a logic circuit that outputs a logical sum of two input signals. The transistor 301, the capacitor 302, the comparator 303, and the OR gate 304 operate with a digital power source system (for example, 1.2V). The level shifter 305 is a voltage converter circuit that changes a voltage between the input terminal and the output terminal. Thereby, the exposure control circuit 201 can output a signal having a voltage suitable to control the pixel circuit 202. The level shifter 305 operates with an analog power source system (for example, 3.3V).

The control signal PEXP_DATA is input to the drain of the transistor 301, and a control signal PGATE is input to the gate of the transistor 301. The source of the transistor 301 is connected to the first terminal of the two terminals of the capacitor 302 and the input terminal of the comparator 303. The control signal PRAMP is input to the second terminal of the two terminals of the capacitor 302. The output terminal of the comparator 303 is connected to the first input terminal of the OR gate 304. The control signal PTX_READ is input to the second input terminal of the OR gate 304. The output terminal of the OR gate 304 is connected to the input terminal of the level shifter 305. The power source terminal of the level shifter 305 is connected to a potential line that supplies a power source potential AVDD. The ground terminal of the level shifter 305 is connected to a potential line that supplies a ground potential AGND. The output terminal of the level shifter 305 forms the output terminal of the exposure control circuit 201. That is, the output terminal of the level shifter 305 is connected to the pixel circuit 202 and outputs the control signal PTX to the pixel circuit 202. In such a way, the exposure control circuit 201 generates the control signal PTX based on a result of comparison between the input voltage Vexp and the comparison level Vbase and outputs the generated control signal PTX to the pixel circuit 202.

Figure 6:
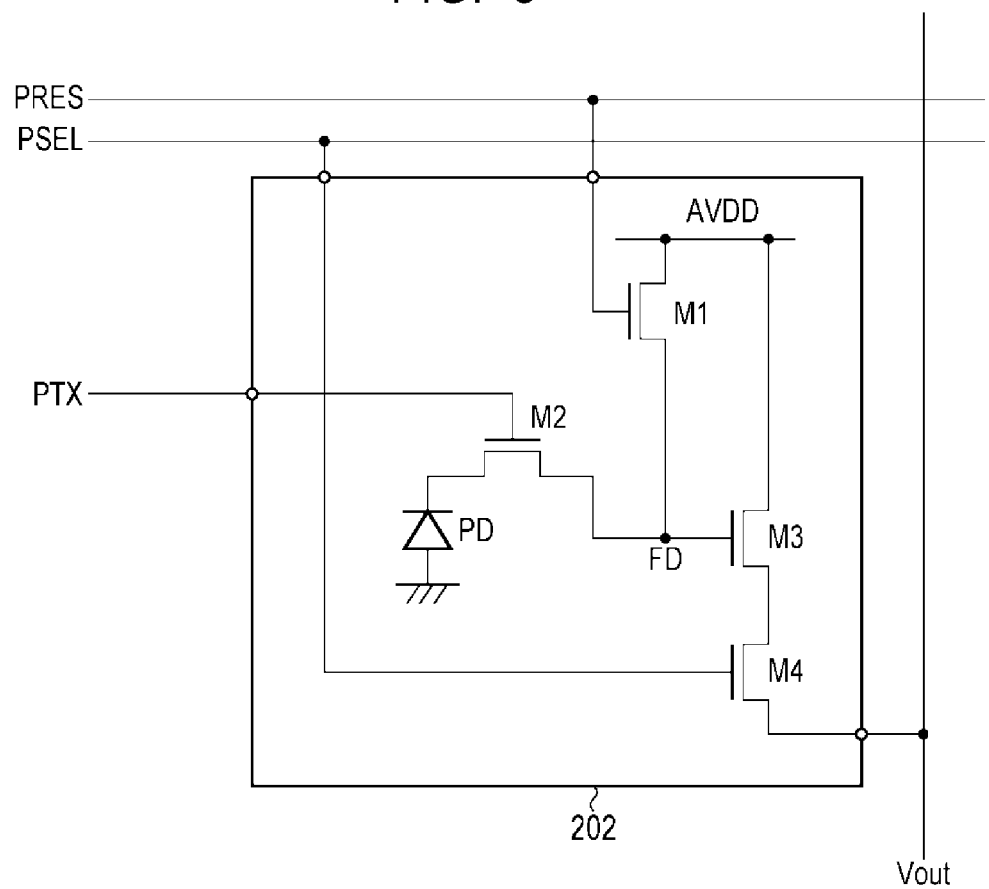
FIG. 6 is a circuit diagram illustrating a configuration example of a pixel circuit according to the first embodiment.

FIG. 6 is a block diagram illustrating a configuration example of the pixel circuit 202 according to the present embodiment. The pixel circuit 202 has a photoelectric conversion unit PD, a reset transistor M1, a transfer transistor M2, an amplifier transistor M3, and a select transistor M4. Each transistor is an NMOS transistor, for example. In the following description, each of the reset transistor M1, the transfer transistor M2, and the select transistor M4 is in an on-state when the control signal input to the gate is at a high level, and each of these transistors is in an off-state when the control signal input to the gate is at a low level.

The photoelectric conversion unit PD is a photodiode, for example. The anode of the photodiode forming the photoelectric conversion unit PD is connected to a potential line that supplies a reference potential, and the cathode is connected to the source of the transfer transistor M2. The control signal PTX is input to the gate (control terminal) of the transfer transistor M2. The drain of the transfer transistor M2 is connected to the source of the reset transistor M1 and the gate of the amplifier transistor M3. The connection node of the drain of the transfer transistor M2, the source of the reset transistor M1, and the gate of the amplifier transistor M3 is a so-called floating diffusion FD. The floating diffusion FD includes a capacitance component, functions as a charge holding portion, and forms a charge-to-voltage conversion unit formed of this capacitance component.

The drain of the reset transistor M1 and the drain of the amplifier transistor M3 are connected to the potential line that supplies the power source potential AVDD. The control signal PRES is input to the gate of the reset transistor M1. The source of the amplifier transistor M3 is connected to the drain of the select transistor M4. The control signal PSEL is input to the gate of the select transistor M4. The source of the select transistor M4 is connected to the pixel output line. That is, the source of the select transistor M4 is an output node of the pixel circuit 202 (or the pixel P).

When an optical image of an object enters the pixel unit 101, the photoelectric conversion unit PD of each pixel P converts (photoelectrically converts) the incident light into an amount of charges in accordance with the light amount and accumulates the generated charges. When controlled to the on-state in response to the control signal PTX, the transfer transistor M2 transfers charges held in the photoelectric conversion unit PD to the floating diffusion FD. The voltage of the floating diffusion FD becomes a voltage in accordance with the amount of charges transferred from the photoelectric conversion unit PD due to charge-to-voltage conversion caused by the capacitance component of the floating diffusion FD. The amplifier transistor M3 is configured such that the power source potential AVDD is supplied to the drain and a bias current is supplied to the source from a current source (not illustrated) via the select transistor M4 and forms an amplifier unit (source follower circuit) whose gate is an input node. Thereby, the amplifier transistor M3 outputs a signal based on the voltage of the floating diffusion FD to the pixel output line via the select transistor M4. When controlled to the on-state, the reset transistor M1 resets the floating diffusion FD to a voltage in accordance with the power source potential AVDD.

Figure 7:
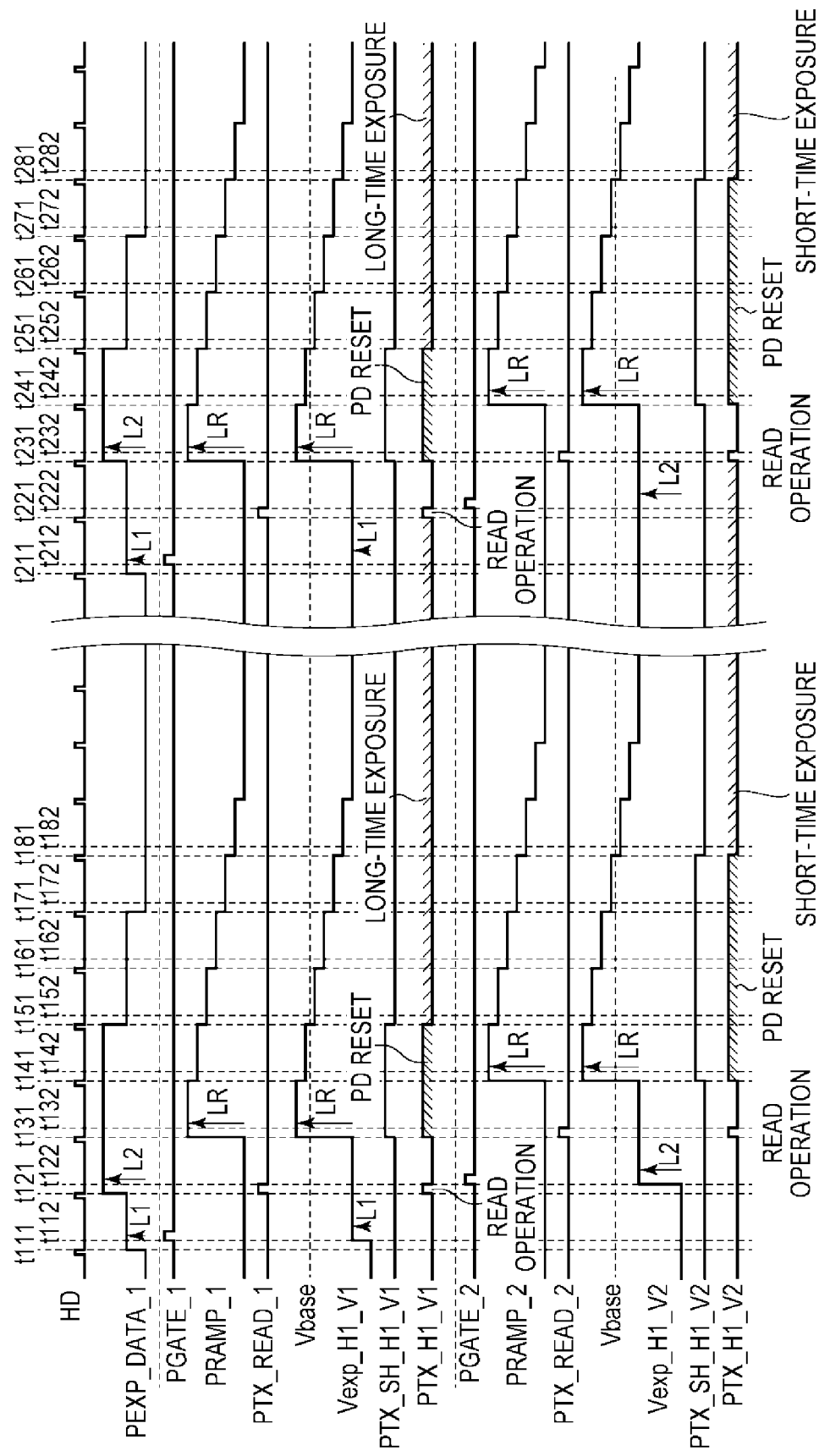
FIG. 7 is a timing chart illustrating an operation example of the photoelectric conversion device according to the first embodiment.

FIG. 7 is a timing chart illustrating an operation example of the photoelectric conversion device according to the present embodiment. With reference to FIG. 7, the operation of exposure period control performed by the photoelectric conversion device will be described. In FIG. 7, only the operations of the pixels P(1, 1) and P(1, 2) on the first row and the second row on the first column of the pixel unit 101 are extracted and illustrated. In the present embodiment, a long period exposure (long-time exposure) is set for the pixel P(1, 1), and a short period exposure (short-time exposure) is set for the pixel P(1, 2). Note that the horizontal synchronization signal HD illustrated in FIG. 7 is a signal that indicates a start timing of an operation for one row.

First, the operation of the pixel P(1, 1) on the first column and the first row will be described. At time t111, the potential of the control signal PEXP_DATA_1 becomes L1. Note that the control signal PEXP_DATA_1 is an analog signal as illustrated in FIG. 7. At time t112, the control signal PGATE_1 is controlled to the high level, and the transistor 301 is turned on. Thereby, the potential L1 of the control signal PEXP_DATA_1 is transferred to the input terminal of the comparator 303, and the input voltage Vexp_H1_V1 increases by L1. This voltage is held in the capacitor 302.

At time t121, the control signal PTX_READ_1 is controlled to the high level. Thereby, the output of the OR gate 304 transitions to the high level, and the control signal PTX_H1_V1 also transitions to the high level. Then, at time t122, the control signal PTX_READ_1 is controlled to the low level. Thereby, the output of the OR gate 304 transitions to the low level, and the control signal PTX_H1_V1 also transitions to the low level. By a series of such control, a read operation is performed in which charges accumulated in the photoelectric conversion unit PD of the pixel P(1, 1) are transferred to the floating diffusion FD and a signal in accordance with the transferred charges is read out. With the OR gate 304 that receives the control signal PTX_READ_1 being provided, the transfer transistor M2 can be controlled independently of the control caused by the input voltage Vexp_H1_V1.

At time t131, the potential of the control signal PRAMP_1 becomes LR. Note that the control signal PRAMP_1 is also an analog signal as illustrated in FIG. 7. The potential of the control signal PRAMP_1 changes stepwise in accordance with time as illustrated in FIG. 7.

At this time, the capacitor 302 operates so as to hold the voltage between electrodes in response to a change in the potential of the control signal PRAMP_1. That is, the input voltage Vexp_H1_V1 increases by LR to be L1+LR. Further, at this time, since the input voltage Vexp_H1_V1 exceeds the comparison level Vbase of the comparator 303, the output voltage PTX_SH_H1_V1 of the comparator 303 transitions to the high level. Thereby, the output of the OR gate 304 transitions to the high level, and the control signal PTX_H1_V1 also transitions to the high level. This time t131 is a start timing of reset of the photoelectric conversion unit PD of the pixel P(1, 1).

On and after time t131, the potential of the control signal PRAMP_1 decreases by a certain amount at every constant time interval (time t141, t151, t161, t171, t181, . . . ) in accordance with the horizontal synchronization signal HD. The input voltage Vexp_H1_V1 similarly decreases in response to the change in the potential of the control signal PRAMP_1.

In the example of FIG. 7, at time t151, the input voltage Vexp_H1_V1 decreases below the comparison level Vbase of the comparator 303, and the output voltage PTX_SH_H1_V1 of the comparator 303 transitions to the low level. Thereby, the output of the OR gate 304 transitions to the low level, and the control signal PTX_H1_V1 also transitions to the low level. This time t151 is the end timing of the reset of the photoelectric conversion unit PD of the pixel P(1, 1), that is, a start timing of exposure. In other words, the start timing of exposure is the timing when the level relationship between the input voltage Vexp_H1_V1 and the comparison level Vbase changes.

The start timing of exposure occurs at later time for a higher potential of the control signal PEXP_DATA_1. Therefore, the higher the potential of the control signal PEXP_DATA_1 is, the shorter the exposure period is. In such a way, the control signal PEXP_DATA_1 is held in the capacitor 302 as the input voltage Vexp and used for control of the start timing of exposure as a signal corresponding to an exposure period.

Then, on and after time t211, the same operation as that from time t111 to time t182 is repeated. During time t221 to time t222, a read operation for charges accumulated in the photoelectric conversion unit PD of the pixel P(1, 1) within a long-time exposure period from time t151 to time t221 is performed. Thereby, a series of signal acquisition processes from exposure to a read operation ends.

Next, the operation of the pixel P(1, 2) on the first column and the second row will be described. Description of a part common to the description of the operation of the pixel P(1, 1) on the first column and the first row will be omitted or simplified.

At time t121, the potential of the control signal PEXP_DATA_1 becomes L2. At time t122, the control signal PGATE_2 transitions to the high level, and the transistor 301 is turned on. Thereby, the potential L2 of the control signal PEXP_DATA_1 is transferred to the input terminal of the comparator 303, and the input voltage Vexp_H1_V2 increases by L2. This voltage is held in the capacitor 302.

A read operation is performed from time t131 to time t132. At time t141, the potential of the control signal PRAMP_2 becomes LR. At this time, the capacitor 302 operates so as to hold the voltage between electrodes in response to a change in the potential of the control signal PRAMP_2. That is, the input voltage Vexp_H1_V2 increases by LR to be L2+LR. Further, at this time, since the input voltage Vexp_H1_V2 exceeds the comparison level Vbase of the comparator 303, the output voltage PTX_SH_H1_V2 of the comparator 303 transitions to the high level. Thereby, the output of the OR gate 304 transitions to the high level, and the control signal PTX_H1_V2 also transitions to the high level. This time t141 is a start timing of reset of the photoelectric conversion unit PD of the pixel P(1, 2).

On and after time t141, the potential of the control signal PRAMP_2 and the input voltage Vexp_H1_V2 decrease at every constant time interval. In the example of FIG. 7, at time t181, the input voltage Vexp_H1_V2 decreases below the comparison level Vbase of the comparator 303, and the output voltage PTX_SH_H1_V2 of the comparator 303 transitions to the low level. Thereby, the output of the OR gate 304 transitions to the low level, and the control signal PTX_H1_V2 also transitions to the low level. This time t181 is the end timing of the reset of the photoelectric conversion unit PD of the pixel P(1, 2), that is, a start timing of exposure.

As described above, since the start timing of exposure occurs at later time for a higher potential of the control signal PEXP_DATA_1, the exposure period is shorter for a higher potential of the control signal PEXP_DATA_1. Since the potential L2 is higher than the potential L1, the exposure period of the pixel P(1, 2) is shorter than the exposure period of the pixel P(1, 1).

Then, during time t231 to time t232, a read operation for charges accumulated in the photoelectric conversion unit PD of the pixel P(1, 2) within a short-time exposure period from time t181 to time t231 is performed. Thereby, a series of signal acquisition processes from exposure to a read operation ends.

In the present embodiment, the control signal PEXP_DATA_1 corresponding to an exposure period is held in the capacitor 302 of the exposure control circuit 201, and thereby different exposure periods can be set on a pixel P basis. In such a configuration, since an exposure period is set by using a voltage held in the capacitor 302, the exposure control circuit 201 can be realized with a simple configuration. Therefore, according to the present embodiment, the circuit scale can be reduced in a photoelectric conversion device in which different exposure periods can be set on a pixel basis.

Second Embodiment

The photoelectric conversion device of the first embodiment is configured in a so-called rolling shutter scheme to start exposure of the pixel P at different timings on a row basis. In contrast, in the present embodiment, a photoelectric conversion device of a so-called global electronic shutter scheme to start exposure collectively for a plurality of pixels P will be described. Description of the configuration common to the first embodiment may be omitted or simplified.

Figure 8:
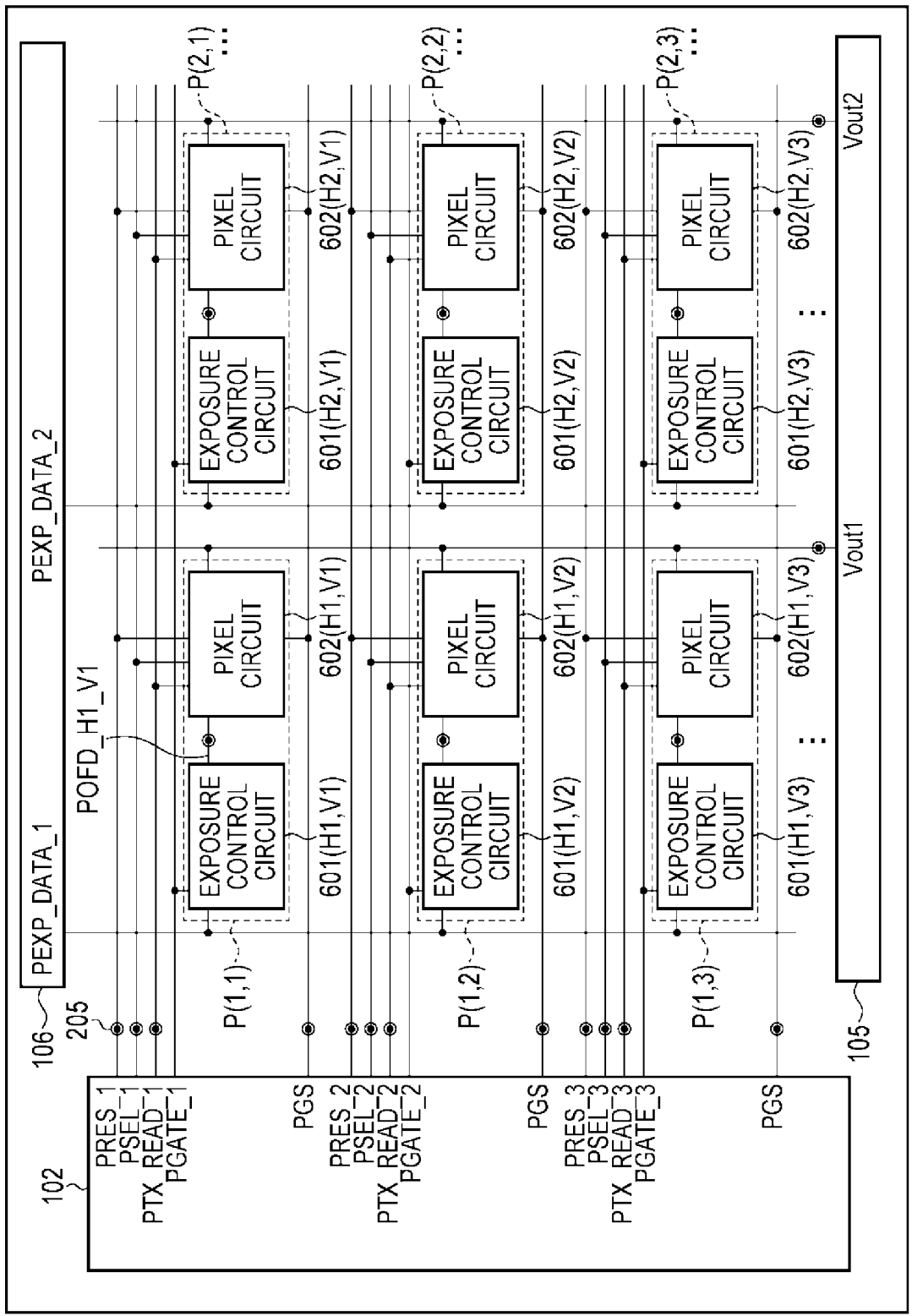
FIG. 8 is a block diagram illustrating a configuration example of a photoelectric conversion device according to a second embodiment.
Figure 9:
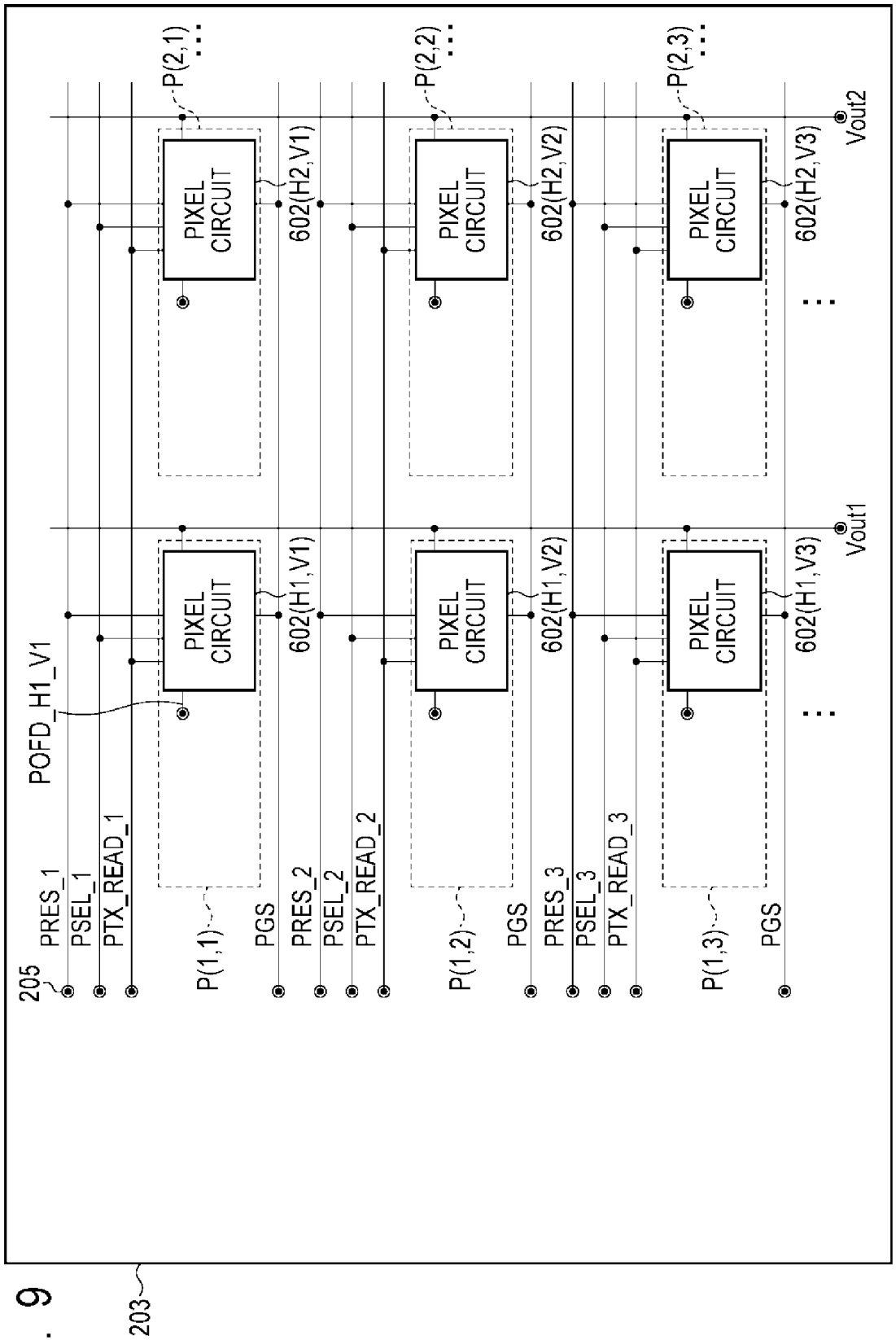
FIG. 9 is a block diagram illustrating a configuration example of a pixel substrate according to the second embodiment.
Figure 10:
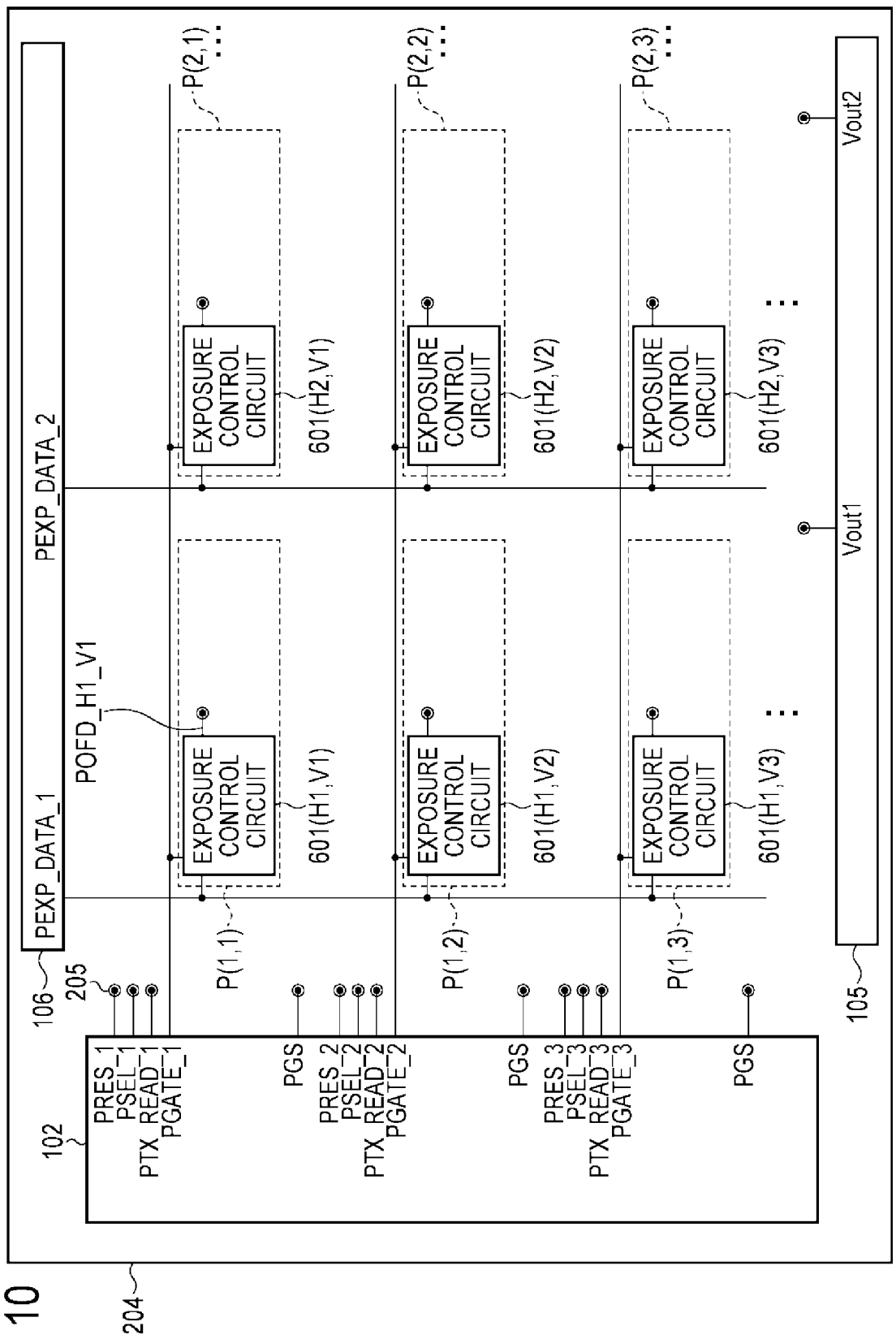
FIG. 10 is a block diagram illustrating a configuration example of a control substrate according to the second embodiment.

Also in the present embodiment, the structure in which two substrates of the pixel substrate and the control substrate are stacked is employed in the same manner as in the first embodiment. FIG. 8 is a block diagram illustrating an overall configuration of the photoelectric conversion device in which the pixel substrate and the control substrate are attached to each other. Further, FIG. 9 is a block diagram illustrating a configuration example of the pixel substrate, and FIG. 10 is a block diagram illustrating a configuration example of the control substrate. A configuration example of the photoelectric conversion device will be described below in more detail with reference to FIG. 8 to FIG. 10.

As illustrated in FIG. 8, each of the plurality of pixels P includes an exposure control circuit 601 and a pixel circuit 602. As illustrated in FIG. 9, a plurality of pixel circuits 602 arranged in a matrix over a plurality of rows and a plurality of columns are provided on the pixel substrate 203. As illustrated in FIG. 10, the pixel control unit 102, the signal output unit 105, the exposure period control unit 106, and the plurality of exposure control circuits 601 arranged in a matrix over a plurality of rows and a plurality of columns are provided on the control substrate 204. The pixel substrate 203 and the control substrate 204 are electrically connected by the plurality of contact portions 205.

The pixel control unit 102 outputs control signals PRES, PSEL, PTX_READ, PGATE, and PGS to the pixels P on each row. The exposure period control unit 106 outputs a control signal PEXP_DATA to the pixel P on each column. In the description of these control signals, when a row number or a column number of a pixel P to which a control signal is supplied is refers to, a row number or a column number may be provided, for example, PRES_1, PSEL_1, PEXP_DATA_1, or the like. Note that, since the control signal PGS is a signal whose level changes at a timing common to respective rows, the row number is not provided thereto.

The control signals PGATE and PEXP_DATA are input to the exposure control circuit 601. The exposure control circuit 601 outputs a control signal POFD to the pixel circuit 602 based on these control signals. Note that, in the description of the control signal POFD, to indicate a column number and a row number of the corresponding pixel P, a row number or a column number may be provided, for example, POFD_H1_V1 or the like.

The control signals PRES, PSEL, PTX_READ, POFD, and PGS are input to the pixel circuit 602. The pixel circuit 602 performs photoelectric conversion in accordance with these control signals and outputs a pixel signal Vout to the signal output unit 105.

Also in the present embodiment, the substrate on which the pixel circuits 602 are arranged and the substrate on which the exposure control circuits 601 are arranged are different from each other, and thereby the element area may be reduced compared to a case where the pixel circuits 602 and the exposure control circuits 601 are arranged on a single substrate.

Figure 11:
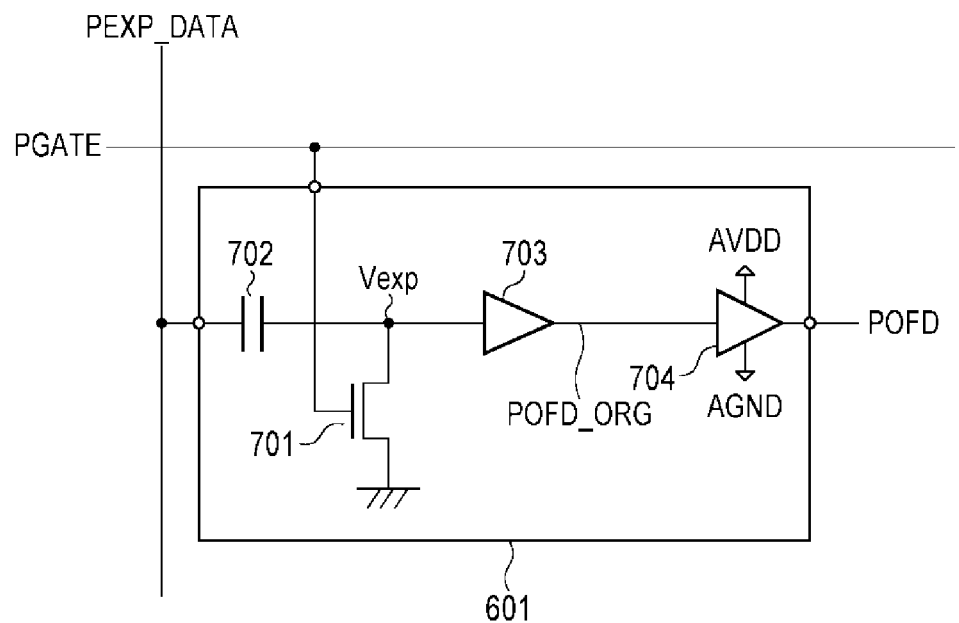
FIG. 11 is a circuit diagram illustrating a configuration example of an exposure control circuit according to the second embodiment.

FIG. 11 is a block diagram illustrating a configuration example of the exposure control circuit 601 according to the present embodiment. The exposure control circuit 601 includes a transistor 701, a capacitor 702, a comparator 703, and a level shifter 704. The transistor 701 is an NMOS transistor, for example. The comparator 703 is a circuit that outputs a high level as an output voltage POFD_ORG when an input voltage Vexp exceeds a comparison level Vbase or, otherwise, outputs a low level as the output voltage POFD_ORG. The transistor 701, the capacitor 702, and the comparator 703 operate with a digital power source system (for example, 1.2V). The level shifter 704 is a voltage converter circuit. The level shifter 704 operates with an analog power source system (for example, 3.3V).

The first terminal of the two terminals of the capacitor 702 is connected to the drain of the transistor 701 and the input terminal of the comparator 703. The control signal PEXP_DATA is input to the second terminal of the two terminals of the capacitor 702. The control signal PGATE is input to the gate of the transistor 701, and the source of the transistor 701 is connected to a potential line that supplies a reference potential. The output terminal of the comparator 703 is connected to the input terminal of the level shifter 704. The power source terminal of the level shifter 704 is connected to the potential line that supplies the power source potential AVDD. The ground terminal of the level shifter 704 is connected to a potential line that supplies the ground potential AGND. The output terminal of the level shifter 704 forms the output terminal of the exposure control circuit 601. That is, the output terminal of the level shifter 704 is connected to the pixel circuit 602 and outputs the control signal POFD to the pixel circuit 602.

Figure 12:
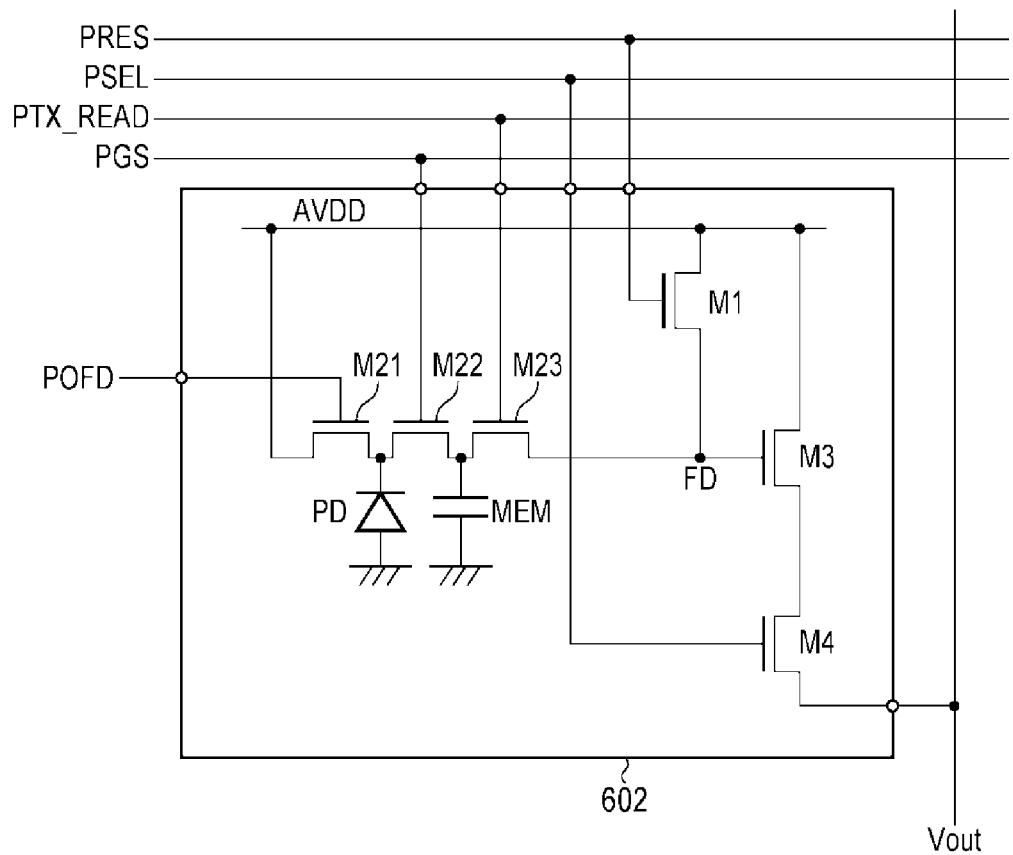
FIG. 12 is a circuit diagram illustrating a configuration example of a pixel circuit according to the second embodiment.

FIG. 12 is a block diagram illustrating a configuration example of the pixel circuit 602 according to the present embodiment. The pixel circuit 602 has a photoelectric conversion unit PD, a holding capacitor MEM, a reset transistor M1, a draining transistor M21, a first transfer transistor M22, a second transfer transistor M23, an amplifier transistor M3, and a select transistor M4. Each transistor is an NMOS transistor, for example. In the following description, each of the reset transistor M1, the draining transistor M21, the first transfer transistor M22, the second transfer transistor M23, and the select transistor M4 is in an on-state when the control signal input to the gate is at a high level. Further, each of these transistors is in an off-state when the control signal input to the gate is at a low level.

The cathode of the photodiode forming the photoelectric conversion unit PD is connected to the source of the first transfer transistor M22 and the source of the draining transistor M21. The control signal POFD is input to the gate (control terminal) of the draining transistor M21. The drain of the draining transistor M21 is connected to the potential line that supplies the power source potential AVDD. The control signal PGS is input to the gate of the first transfer transistor M22. The drain of the first transfer transistor M22 is connected to the first terminal of the holding capacitor MEM and the source of the second transfer transistor M23. The control signal PTX_READ is input to the gate of the second transfer transistor M23. The second terminal of the holding capacitor MEM is connected to the potential line that supplies to the reference voltage. The drain of the second transfer transistor M23 is connected to the source of the reset transistor M1 and the gate of the amplifier transistor M3. Since the circuit configuration other than the above is the same as that of the pixel circuit 202 of FIG. 6, the description thereof will be omitted.

When draining transistor M21 is turned on, charges accumulated in the photoelectric conversion unit PD are transferred to the potential line that supplies the power source potential AVDD. Thereby, the charges accumulated in the photoelectric conversion unit PD are drained, and the node of the cathode of the photoelectric conversion unit PD is reset to a voltage in accordance with the power source potential AVDD. When controlled to the on-state in response to the control signal PGS, the first transfer transistor M22 transfers charges held in the photoelectric conversion unit PD to the holding capacitor MEM. When controlled to the on-state in response to the control signal PTX_READ, the second transfer transistor M23 transfers charges held in the holding capacitor MEM to the floating diffusion FD.

Figure 13:
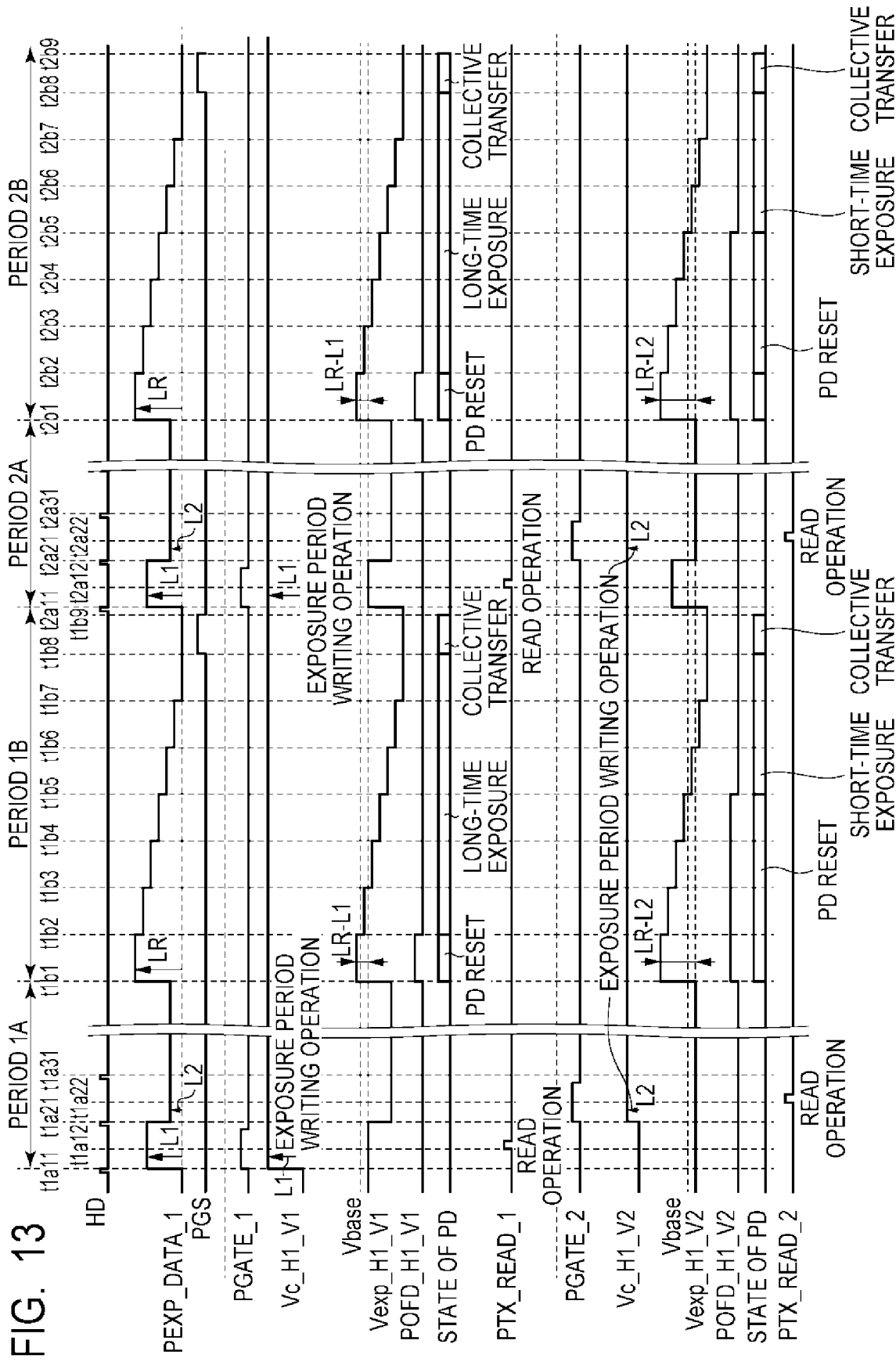
FIG. 13 is a timing chart illustrating an operation example of the photoelectric conversion device according to the second embodiment.

FIG. 13 is a timing chart illustrating an operation example of the photoelectric conversion device according to the present embodiment. With reference to FIG. 13, the operation of exposure period control performed by the photoelectric conversion device will be described. Also in FIG. 13, only the operations of the pixels P(1, 1) and P(1, 2) on the first row and the second row on the first column of the pixel unit 101 are extracted and illustrated in the same manner as FIG. 7 of the first embodiment. Further, a long exposure period (long-time exposure) is set for the pixel P(1, 1), and a short exposure period (short-time exposure) is set for the pixel P(1, 2).

The operation period in accordance with the timing chart of FIG. 13 is classified into two types of periods, namely, periods 1A and 2A in which writing of an exposure period and readout of signals from the pixels P are performed and periods 1B and 2B in which the exposure period is controlled. The periods 1A, 1B, 2A, and 2B illustrated in FIG. 13 represent the classification of the periods described above. Further, the voltages Vc_H1_V1 and Vc_H1_V2 illustrated in FIG. 13 represent the voltage between the terminals of the capacitor 702 included in the pixels P(1, 1) and P(1, 2), respectively.

First, the operation in the period 1A of the pixel P(1, 1) on the first column and the first row will be described. At time t1a11, the potential of the control signal PEXP_DATA_1 becomes L1. Further, at time t1a11, the control signal PGATE_1 is controlled to the high level, and the transistor 701 is turned on. Thereby, the voltage between the terminals of the capacitor 702 becomes L1. Then, the control signal PGATE_1 is controlled to the low level, and the transistor 701 is turned off. With such an operation, the value of the voltage Vc_H1_V1 between the terminals of the capacitor 702 is maintained at L1 in the subsequent period.

At time t1a12, the control signal PTX_READ_1 is controlled to the high level. Thereby, the second transfer transistor M23 is turned on. Thereby, charges held in the holding capacitor MEM are transferred to the floating diffusion FD, and a read operation in which a signal in accordance with the transferred charges is read out is performed.

At time t1b1, the potential of the control signal PEXP_DATA_1 becomes LR. At this time, since the voltage of L1 is held between the electrodes of the capacitor 702, the input voltage Vexp_H1_V1 becomes LR−L1. Further, at this time, since the input voltage Vexp_H1_V1 exceeds the comparison level Vbase of the comparator 703, the output voltage POFD_ORG of the comparator 703 transitions to the high level. Thereby, the control signal POFD_H1_V1 also transitions to the high level. This time t1b2 is the start timing of reset of the photoelectric conversion unit PD of the pixel P(1, 1).

On and after time t1b1, the potential of the control signal PEXP_DATA_1 changes stepwise in accordance with time as illustrated in FIG. 13. That is, on and after time t1b1, the potential of the control signal PEXP_DATA_1 decreases by a certain amount at every constant time interval (time t1b2, t1b3, t1b4, t1b5, t1b6, t1b7). The input voltage Vexp_H1_V1 similarly decreases in response to the change in the potential of the control signal PEXP_DATA_1.

In the example of FIG. 13, at time t1b2, the input voltage Vexp_H1_V1 decreases below the comparison level Vbase of the comparator 703, and the output voltage POFD_ORG of the comparator 703 transitions to the low level. Thereby, the control signal POFD_H1_V1 also transitions to the low level. This time t1b2 is the end timing of the reset of the photoelectric conversion unit PD of the pixel P(1, 1), that is, a start timing of exposure. In other words, the start timing of exposure is a timing when the level relationship between the input voltage Vexp_H1_V1 and the comparison level Vbase changes.

The start timing of exposure occurs at later time for a lower potential of the control signal PEXP_DATA_1. Therefore, the lower the potential of the control signal PEXP_DATA_1 is, the shorter the exposure period is. In such a way, the control signal PEXP_DATA_1 is held in the capacitor 702 as the input voltage Vc_H1_V1 and used for control of the start timing of exposure as a signal indicating an exposure period.

In a period from time t1b8 to time t1b9, the control signal PGS is controlled to the high level, and the first transfer transistor M22 is turned on. Thereby, charges accumulated in the photoelectric conversion unit PD are transferred to the holding capacitor MEM. Note that, although "long-time exposure" is represented for the period from the time t1b2 to time t1b8 in the field of "state of PD" of FIG. 13, charges may occur in the photoelectric conversion unit PD also in the period from time t1b8 to time t1b9. Therefore, to be more exact, the end timing of long-time exposure is time t1b9.

Then, on and after time t2a11, the same operation as that from time t1a11 to time t1b9 is repeated. At time t2a12, a read operation on the charges held in the holding capacitor MEM of the pixel P(1, 1) within a long-time exposure period from time t1b2 to time t1b9 is performed. Thereby, a series of signal acquisition processes from exposure to a read operation ends. In such a way, writing of an exposure period and readout of signals from pixels are performed in parallel in the periods 1A and 2A.

Next, the operation of the pixel P(1, 2) on the first column and the second row will be described. Description of a part common to the description of the operation of the pixel P(1, 1) on the first column and the first row will be omitted or simplified.

At time t1a21, the potential of the control signal PEXP_DATA_1 becomes L2. Further, at time t1a21, the control signal PGATE_2 is controlled to the high level, and the transistor 701 is turned on. Thereby, the voltage between the terminals of the capacitor 702 becomes L2. Then, the control signal PGATE_2 is controlled to the low level, and the transistor 701 is turned off. With such an operation, the value of the voltage Vc_H1_V2 between the terminals of the capacitor 702 is maintained at L2 in the subsequent period.

At time t1a22, the control signal PTX_READ_2 is controlled to the high level, and a read operation is performed. At time t1b1, the potential of the control signal PEXP_DATA_1 becomes LR. At this time, since the voltage of L2 is held between the electrodes of the capacitor 702, the input voltage Vexp_H1_V2 becomes LR−L2. Further, at this time, since the input voltage Vexp_H1_V2 exceeds the comparison level Vbase of the comparator 703, the output voltage POFD_ORG of the comparator 703 transitions to the high level. Thereby, the control signal POFD_H1_V2 also transitions to the high level. This time t1b1 is the start timing of reset of the photoelectric conversion unit PD of the pixel P(1, 2).

On and after time t1b1, the potential of the control signal PEXP_DATA_1 and the input voltage Vexp_H1_V2 decreases at every constant time interval. In the example of FIG. 13, at time t1b5, the input voltage Vexp_H1_V2 decreases below the comparison level Vbase of the comparator 703, and the output voltage POFD_ORG of the comparator 703 transitions to the low level. Thereby, the control signal POFD_H1_V2 also transitions to the low level. This time t1b5 is the end timing of the reset of the photoelectric conversion unit PD of the pixel P(1, 1), that is, a start timing of exposure.

As described above, since the start timing of exposure occurs at later time for a lower potential of the control signal PEXP_DATA_1, the exposure period is shorter for a lower potential of the control signal PEXP_DATA_1. Since the potential L2 is lower than the potential L1, the exposure period of the pixel P(1, 2) is shorter than the exposure period of the pixel P(1, 1).

Then, at time t2a22, a read operation for charges accumulated in the photoelectric conversion unit PD of the pixel P(1, 2) within a short-time exposure period from time t1b5 to time t1b9 is performed. Thereby, a series of the signal acquisition processes from exposure to a read operation ends.

Also in the present embodiment, the control signal PEXP_DATA_1 indicating an exposure period is held in the capacitor 702 of the exposure control circuit 601, and thereby different exposure periods can be set on a pixel P basis in the same manner as in the first embodiment. In such a configuration, since an exposure period is set by using a voltage held in the capacitor 702, the exposure control circuit 601 can be realized with a simple configuration. Therefore, also in the present embodiment, the circuit scale can be reduced in a photoelectric conversion device in which different exposure periods can be set on a pixel basis in the same manner as in the first embodiment. Further, in the present embodiment, driving in a global electronic shutter scheme is enabled, and a rolling shutter distortion is reduced.

Third Embodiment

Figure 14:
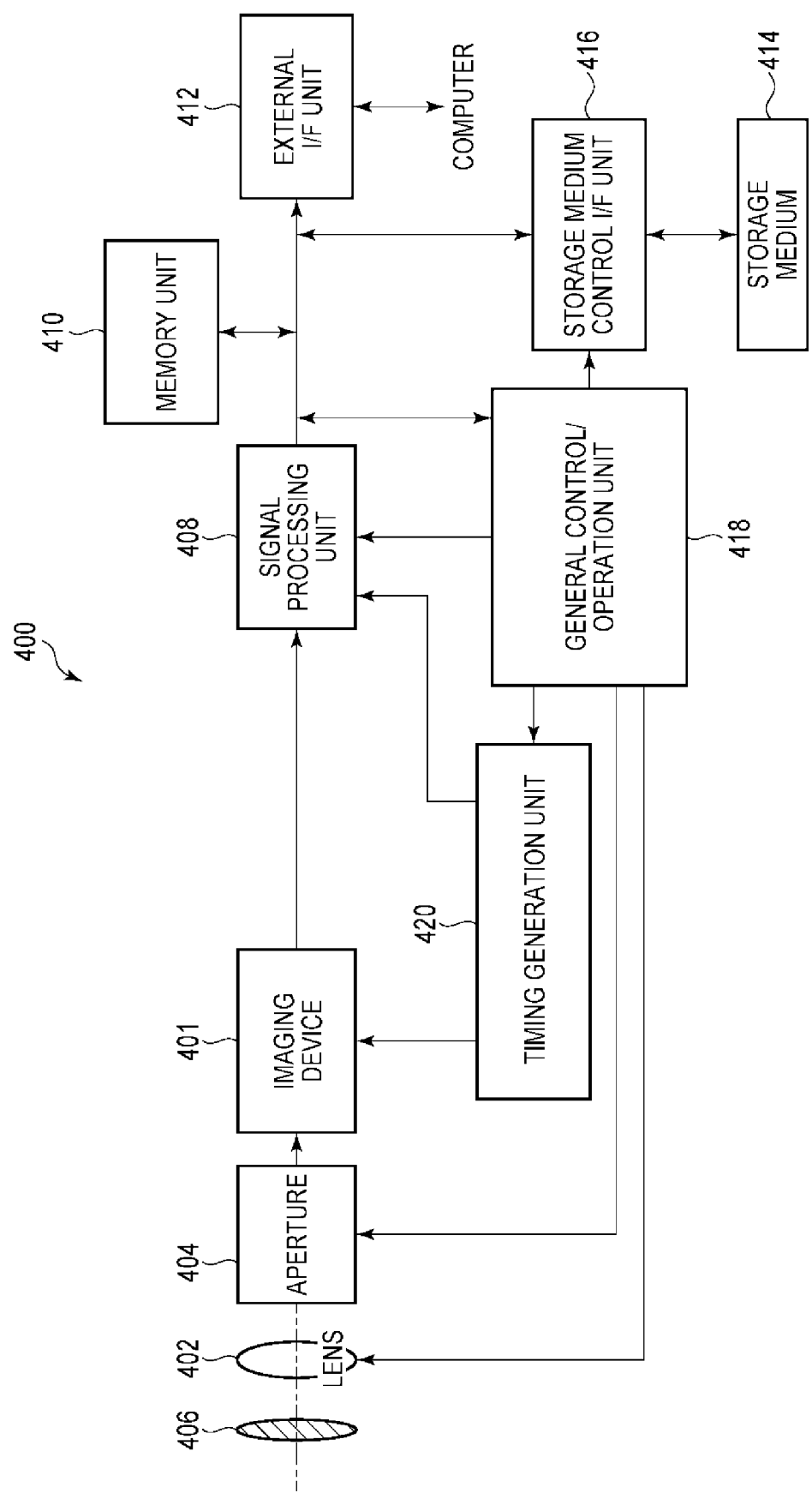
FIG. 14 is a block diagram illustrating a general configuration of an imaging system according to a third embodiment.

An imaging system according to a third embodiment of the present invention will be described with reference to FIG. 14. FIG. 14 is a block diagram illustrating a general configuration of the imaging system according to the present embodiment.

The photoelectric conversion device described above in the first and second embodiments can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device including a photoelectric conversion device is also included in the imaging system. FIG. 14 illustrates a block diagram of a digital still camera as an example out of these examples.

An imaging system 400 illustrated as an example in FIG. 14 has an imaging device 401, a lens 402 that captures an optical image of an object onto the imaging device 401, an aperture 404 for changing a light amount passing through the lens 402, and a bather 406 for protecting the lens 402. The lens 402 and the aperture 404 form an optical system that converges a light onto the imaging device 401. The imaging device 401 is the photoelectric conversion device described in any of the first or second embodiment and converts an optical image captured by the lens 402 into image data.

Further, the imaging system 400 has a signal processing unit 408 that processes an output signal output from the imaging device 401. The signal processing unit 408 performs AD conversion to convert an analog signal output from the imaging device 401 into a digital signal. In addition, the signal processing unit 408 performs operations of performing various correction or compression to output image data, if necessary. The AD conversion unit that is a part of the signal processing unit 408 may be formed on a semiconductor substrate on which the imaging device 401 is provided or formed on a semiconductor substrate separately from the imaging device 401. Further, the imaging device 401 and the signal processing unit 408 may be formed on the same semiconductor substrate.

Furthermore, the imaging system 400 has a memory unit 410 for temporarily storing image data therein and an external interface unit (external I/F unit) 412 for communicating with an external computer or the like. The imaging system 400 further has a storage medium 414 such as a semiconductor memory for performing storage or readout of imaging data and a storage medium control interface unit (storage medium control I/F unit) 416 for performing storage or readout on the storage medium 414. Note that the storage medium 414 may be embedded in the imaging system 400 or may be removable.

Furthermore, the imaging system 400 has a general control/operation unit 418 that performs various calculation and controls the entire digital still camera and a timing generation unit 420 that outputs various timing signals to the imaging device 401 and the signal processing unit 408. Here, the timing signal or the like may be input from the outside, and the imaging system 400 may have at least the imaging device 401 and the signal processing unit 408 that processes an output signal output from the imaging device 401.

The imaging device 401 outputs an imaging signal to the signal processing unit 408. The signal processing unit 408 performs predetermined signal processing on an imaging signal output from the imaging device 401 and outputs image data. The signal processing unit 408 uses an imaging signal to generate an image. Further, in the signal processing unit 408, a high dynamic range image may be composed based on signals acquired from a plurality of pixels P for which the lengths of exposure period are different.

As described above, according to the present embodiment, the imaging system 400 to which the photoelectric conversion device according to the first or second embodiment is applied can be realized.

Fourth Embodiment

Figure 15A:
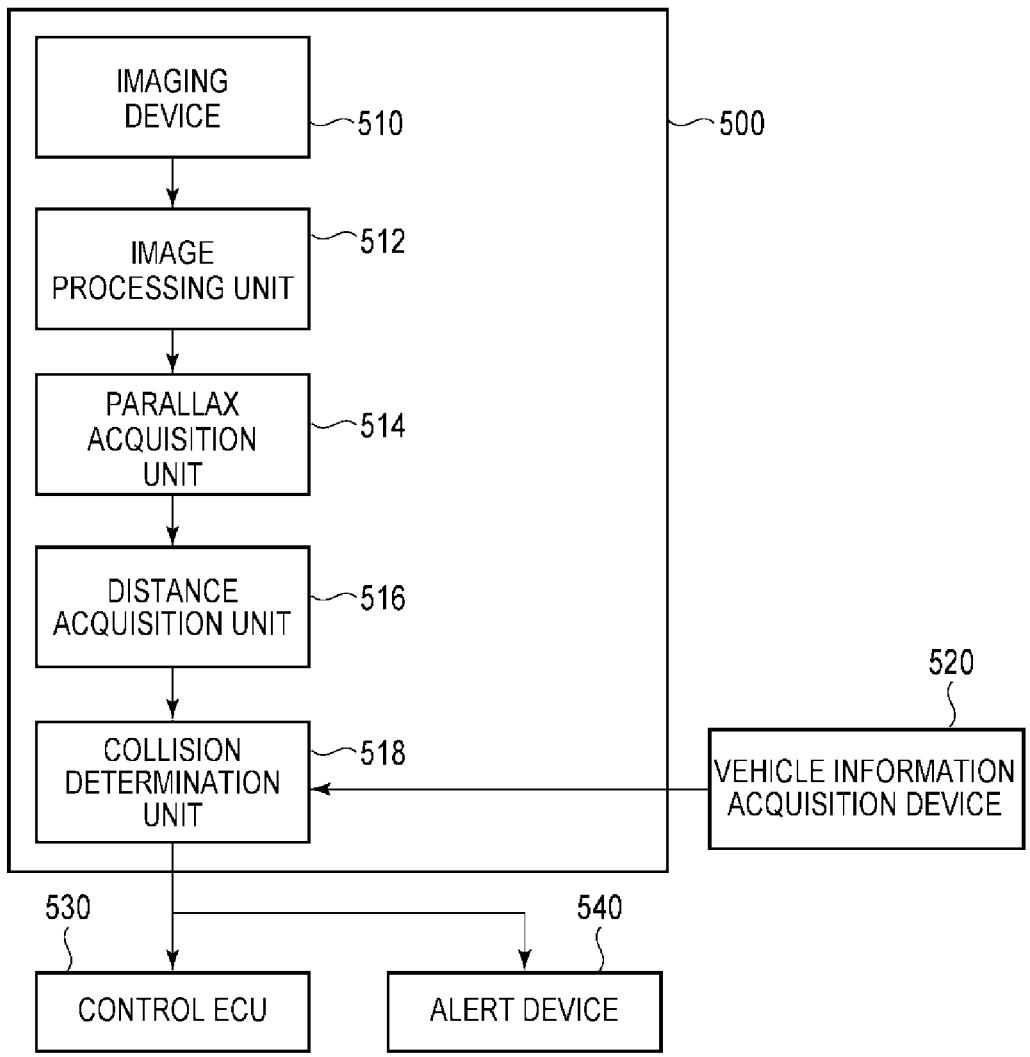
FIG. 15A and FIG. 15B are diagrams illustrating a configuration example of an imaging system and a moving body according to a fourth embodiment.
Figure 15B:
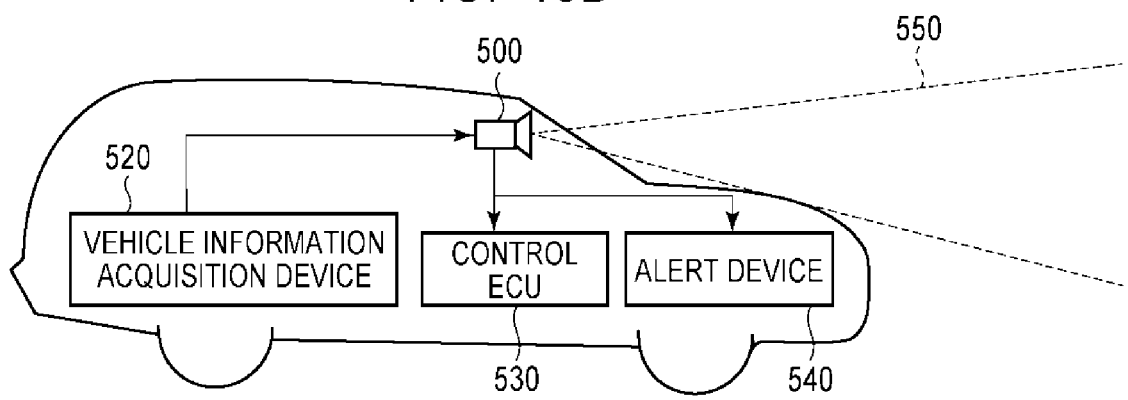

An imaging system and a moving body according to a fourth embodiment of the present invention will be described with reference to FIG. 15A and FIG. 15B. FIG. 15A and FIG. 15B are diagrams illustrating the configuration of the imaging system and the moving body according to the present embodiment.

FIG. 15A illustrates an example of an imaging system related to an on-vehicle camera. An imaging system 500 has an imaging device 510. The imaging device 510 is the photoelectric conversion device described above in any of the first and second embodiments. The imaging system 500 has an image processing unit 512 that performs image processing on a plurality of image data acquired by the imaging device 510 and a parallax acquisition unit 514 that calculates a parallax (a phase difference of parallax images) from the plurality of image data acquired by the imaging system 500. Further, the imaging system 500 has a distance acquisition unit 516 that calculates a distance to the object based on the calculated parallax and a collision determination unit 518 that determines whether or not there is a collision possibility based on the calculated distance. Here, the parallax acquisition unit 514 and the distance acquisition unit 516 are an example of a distance information acquisition unit that acquires distance information on the distance to the object. That is, the distance information is information on a parallax, a defocus amount, a distance to an object, or the like. The collision determination unit 518 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like or may be implemented by a combination thereof.

The imaging system 500 is connected to the vehicle information acquisition device 520 and can acquire vehicle information such as a vehicle speed, a yaw rate, a steering angle, or the like. Further, the imaging system 500 is connected to a control ECU 530, which is a control device that outputs a control signal for causing a vehicle to generate braking force based on a determination result by the collision determination unit 518. Further, the imaging system 500 is also connected to an alert device 540 that issues an alert to the driver based on a determination result by the collision determination unit 518. For example, when the collision probability is high as the determination result of the collision determination unit 518, the control ECU 530 performs vehicle control to avoid a collision or reduce damage by applying a brake, pushing back an accelerator, suppressing engine power, or the like. The alert device 540 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 500. FIG. 15B illustrates the imaging system when a front area of a vehicle (a capturing area 550) is captured. The vehicle information acquisition device 520 transmits an instruction to the imaging system 500 or the imaging device 510. Such a configuration can further improve the ranging accuracy.

Although the example of control for avoiding a collision to another vehicle has been described, the embodiment is applicable to automatic driving control for following another vehicle, automatic driving control for not going out of a traffic lane, or the like. Furthermore, the imaging system is not limited to a vehicle such as the subject vehicle and can be applied to a moving body (moving apparatus) such as a ship, an airplane, or an industrial robot, for example. In addition, the imaging system can be widely applied to a device which utilizes object recognition, such as an intelligent transportation system (ITS), without being limited to moving bodies.

Modified Embodiments

The present invention is not limited to the embodiments described above, and various modifications are possible. For example, an example in which a part of the configuration of any of the embodiments is added to another embodiment or an example in which a part of the configuration of any of the embodiments is replaced with a part of the configuration of another embodiment is also one of the embodiments of the present invention.

Further, the circuit configuration and the control signals of the photoelectric conversion device illustrated in the first and second embodiments described above are not limited to the illustrated configuration examples, and modification or change can be made thereto as appropriate as long as the same advantageous effects as those described in each embodiment can be realized.

In the first and second embodiments described above, a single exposure control circuit is provided to a single pixel circuit. Accordingly, it is possible to control an individual exposure period for each pixel circuit. However, this is not essential, and a single exposure control circuit may be provided to two or more pixel circuits. In such a case, since one exposure control circuit can collectively control the exposure periods of the pixel region including a plurality of pixel circuits, the number of exposure control circuits can be reduced, and the circuit scale can be further reduced.

In the present embodiment, the comparator 303 or 703 may be replaced with another type of circuit element as long as it is configured to be able to output a signal in accordance with a level relationship with respect to the comparison level Vbase. For example, the comparator 303 or 703 may be replaced with an inverter (NOT gate). In such a way, the comparator 303 or 703 may be replaced with any type of comparator circuits having a comparison function of signals.

Although the exposure control circuits 201 and 601 each includes elements on a digital power source system and elements on an analog power source system in the present embodiment, all the elements may be elements on an analog power source system.

Further, the imaging systems illustrated in the third and fourth embodiments described above are examples of an imaging system to which the photoelectric conversion device of the present invention may be applied, and an imaging system to which the photoelectric conversion device of the present invention can be applied is not limited to the illustrated configuration.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147706, filed Aug. 9, 2019, which is hereby incorporated by reference herein in its entirety.

What is claimed is:

1. A photoelectric conversion device comprising:
a plurality of pixel circuits each including a photodiode configured to generate charges by photoelectric conversion and a transistor having a first main electrode connected to the photodiode, a second main electrode, and a control terminal, the transistor being configured to transfer the charges from the photodiode; and
a plurality of exposure control circuits each including a capacitor configured to hold a signal corresponding to an exposure period in the photodiode and a comparator circuit configured to compare a potential of a first terminal of two terminals of the capacitor with a threshold potential, wherein each of the plurality of exposure control circuits controls an exposure period of the photodiode by outputting a signal based on a comparison result caused by the comparator circuit to the control terminal of the transistor and driving the transistor, and wherein a control signal whose potential changes in accordance with time is input to a second terminal of the two terminals of the capacitor.

2. The photoelectric conversion device according to claim 1, wherein exposure in the photodiode is started by the transistor being driven from an on-state to an off-state at a timing when a level relationship between the potential of the first terminal and the threshold potential changes.

3. The photoelectric conversion device according to claim 1, wherein exposure in the photodiode ends by the transistor being driven from an off-state to an on-state.

4. The photoelectric conversion device according to claim 3, wherein the plurality of pixel circuits are arranged over a plurality of rows, the photoelectric conversion device further comprising a pixel control circuit configured to control a timing to output a signal based on the charges for each row of the plurality of rows, wherein the pixel control circuit outputs a signal used for controlling a timing when the transistor is driven from an off-state to an on-state to the pixel circuit for each row of the plurality of rows.

5. The photoelectric conversion device according to claim 1, wherein each of the plurality of exposure control circuits further includes a voltage converter circuit arranged between an output terminal of the comparator circuit and the control terminal of the transistor.

6. The photoelectric conversion device according to claim 1, wherein the transistor transfers the charges from the photodiode to a potential line having a predetermined potential.

7. The photoelectric conversion device according to claim 1, wherein the plurality of pixel circuits are arranged on a first substrate; and wherein the plurality of exposure control circuits are arranged on a second substrate.

8. The photoelectric conversion device according to claim 1, wherein each of the plurality of exposure control circuits controls corresponding one pixel circuit of the plurality of pixel circuits.

9. The photoelectric conversion device according to claim 1, wherein each of the plurality of exposure control circuits controls corresponding two or more pixel circuits of the plurality of pixel circuits.

10. An imaging system comprising:

the photoelectric conversion device according to claim 1; and a signal processing circuit configured to process signals output from the pixel circuits of the photoelectric conversion device.

11. A moving body comprising:

the photoelectric conversion device according to claim 1;

a distance information acquisition circuit configured to acquire, from a parallax image based on signals from the photoelectric conversion device, distance information on a distance to an object; and a control circuit configured to control the moving body based on the distance information.

12. The photoelectric conversion device according to claim 1, wherein the signal held in the capacitor is input to the plurality of exposure control circuits via a common control line.

13. The photoelectric conversion device according to claim 12, wherein by a signal used for controlling a timing when the capacitor holds a signal input from the control line being input separately to each of the plurality of exposure control circuits, the capacitor of each of the plurality of pixel circuits holds a signal corresponding to the exposure period at a different timing from each other.

14. An exposure control device configured to control a plurality of pixel circuits each including a photodiode configured to generate charges by photoelectric conversion and a transistor having a first main electrode connected to the photodiode, a second main electrode, and a control terminal, the transistor being configured to transfer the charges from the photodiode, the exposure control device comprising:

a plurality of exposure control circuits each including a capacitor configured to hold a signal corresponding to an exposure period in the photodiode and a comparator circuit configured to compare a potential of a first terminal of two terminals of the capacitor with a threshold potential, wherein each of the plurality of exposure control circuits controls an exposure period of the photodiode by outputting a signal based on a comparison result caused by the comparator circuit to the control terminal of the transistor and driving the transistor, wherein a control signal whose potential changes in accordance with time is input to a second terminal of the two terminals of the capacitor.

15. A photoelectric conversion device comprising:

a plurality of pixel circuits each including a photodiode configured to generate charges by photoelectric conversion and a transistor having a first main electrode connected to the photodiode, a second main electrode, and a control terminal, the transistor being configured to transfer the charges from the photodiode; and a plurality of exposure control circuits each including a capacitor configured to hold a signal corresponding to an exposure period in the photodiode and a comparator circuit configured to compare a potential of a first terminal of two terminals of the capacitor with a threshold potential, wherein each of the plurality of exposure control circuits controls an exposure period of the photodiode by outputting a signal based on a comparison result caused by the comparator circuit to the control terminal of the transistor and driving the transistor, wherein each of the plurality of pixel circuits further includes an amplifier circuit configured to output a signal in accordance with an amount of charges transferred to an input node, and wherein the transistor transfers the charges from the photodiode to the input node of the amplifier circuit.

16. The photoelectric conversion device according to claim 15, wherein exposure in the photodiode is started by the transistor being driven from an on-state to an off-state at a timing when a level relationship between the potential of the first terminal and the threshold potential changes.

17. The photoelectric conversion device according to claim 15, wherein exposure in the photodiode ends by the transistor being driven from an off-state to an on-state.

18. The photoelectric conversion device according to claim 17, wherein the plurality of pixel circuits are arranged over a plurality of rows, the photoelectric conversion device further comprising
  a pixel control circuit configured to control a timing to output a signal based on the charges for each row of the plurality of rows,
  wherein the pixel control circuit outputs a signal used for controlling a timing when the transistor is driven from an off-state to an on-state to the pixel circuit for each row of the plurality of rows.

19. The photoelectric conversion device according to claim 15, wherein each of the plurality of exposure control circuits further includes a voltage converter circuit arranged between an output terminal of the comparator circuit and the control terminal of the transistor.

20. The photoelectric conversion device according to claim 15, wherein the transistor transfers the charges from the photodiode to a potential line having a predetermined potential.

21. The photoelectric conversion device according to claim 15,
  wherein the plurality of pixel circuits are arranged on a first substrate; and
  wherein the plurality of exposure control circuits are arranged on a second substrate.

22. The photoelectric conversion device according to claim 15, wherein each of the plurality of exposure control circuits controls corresponding one pixel circuit of the plurality of pixel circuits.

23. The photoelectric conversion device according to claim 15, wherein each of the plurality of exposure control circuits controls corresponding two or more pixel circuits of the plurality of pixel circuits.

24. An imaging system comprising:
  the photoelectric conversion device according to claim 15; and
  a signal processing circuit configured to process signals output from the pixel circuits of the photoelectric conversion device.

25. A moving body comprising:
  the photoelectric conversion device according to claim 15;
  a distance information acquisition circuit configured to acquire, from a parallax image based on signals from the photoelectric conversion device, distance information on a distance to an object; and
  a control circuit configured to control the moving body based on the distance information.

26. The photoelectric conversion device according to claim 15, wherein the signal held in the capacitor is input to the plurality of exposure control circuits via a common control line.

27. The photoelectric conversion device according to claim 26, wherein by a signal used for controlling a timing when the capacitor holds a signal input from the control line being input separately to each of the plurality of exposure control circuits, the capacitor of each of the plurality of pixel circuits holds a signal corresponding to the exposure period at a different timing from each other.

28. The photoelectric conversion device according to claim 15, wherein a control signal whose potential changes in accordance with time is input to a second terminal of the two terminals of the capacitor.

29. An exposure control device configured to control a plurality of pixel circuits each including a photodiode configured to generate charges by photoelectric conversion and a transistor having a first main electrode connected to the photodiode, a second main electrode, and a control terminal, the transistor being configured to transfer the charges from the photodiode, the exposure control device comprising:
  a plurality of exposure control circuits each including a capacitor configured to hold a signal corresponding to an exposure period in the photodiode and a comparator circuit configured to compare a potential of a first terminal of two terminals of the capacitor with a threshold potential,
  wherein each of the plurality of exposure control circuits controls an exposure period of the photodiode by outputting a signal based on a comparison result caused by the comparator circuit to the control terminal of the transistor and driving the transistor,
  wherein each of the plurality of pixel circuits further includes an amplifier circuit configured to output a signal in accordance with an amount of charges transferred to an input node, and
  wherein the transistor transfers the charges from the photodiode to the input node of the amplifier circuit.

* * * * *